United States Patent
Susitaival et al.

(10) Patent No.: US 10,271,373 B2
(45) Date of Patent: *Apr. 23, 2019

(54) PROHIBITING FAILURE INDICATIONS FOR SECONDARY CELL GROUP FAILURE

(71) Applicant: Telefonaktiebolaget LM Ericsson (publ), Stockholm (SE)

(72) Inventors: Riikka Susitaival, Helsinki (FI); Torsten Dudda, Aachen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/901,577

(22) Filed: Feb. 21, 2018

(65) Prior Publication Data

US 2018/0184482 A1    Jun. 28, 2018

Related U.S. Application Data

(63) Continuation of application No. 14/902,407, filed as application No. PCT/SE2015/051109 on Oct. 20, 2015, now Pat. No. 9,907,110.

(Continued)

(51) Int. Cl.
   *H04W 76/00* (2018.01)
   *H04W 76/27* (2018.01)
   (Continued)

(52) U.S. Cl.
   CPC ........... *H04W 76/27* (2018.02); *H04W 76/15* (2018.02); *H04W 76/18* (2018.02); *H04W 76/25* (2018.02); *H04W 88/06* (2013.01)

(58) Field of Classification Search
   CPC ..... H04W 76/27; H04W 76/25; H04W 76/15; H04W 76/18; H04W 88/06
   See application file for complete search history.

(56) References Cited

U.S. PATENT DOCUMENTS 8,768,305 B1    7/2014  Singh et al.
2013/0183974 A1    7/2013  Johansson et al.
(Continued)

FOREIGN PATENT DOCUMENTS

RU    2495548 C2    10/2013

OTHER PUBLICATIONS

Unknown, Author, "Remaining issues in S-RLF", NEC, 3GPP TSG RAN2 Meeting #86, R2-142411, Seoul, South Korea, May 19-23, 2014, 1-9.

(Continued)

*Primary Examiner* — Khai M Nguyen
(74) *Attorney, Agent, or Firm* — Murphy, Bilak & Homiller, PLLC

(57) ABSTRACT

A UE operating in a network that supports dual connectivity operation is configured to minimize the transmission of unnecessary UE failure indications. The UE detects secondary cell group (SCG) failure for the UE, in response to detecting one of a plurality of SCG failure-triggering events. The UE sends a UE failure indication message, in response to the detecting SCG failure, and refrains from sending further UE failure indication messages in response to SCG failure-triggering events, until the sending of further UE failure indication messages is reenabled. In some cases, the UE sets a state of the UE to a UE prohibit state to prohibit sending further UE failure indication messages while in the UE prohibit state. In other cases, the UE starts a prohibit timer to prohibit sending further UE failure indication messages during the prohibit timer.

19 Claims, 10 Drawing Sheets

Related U.S. Application Data

(60) Provisional application No. 62/066,040, filed on Oct. 20, 2014.

(51) Int. Cl.
  *H04W 76/18* (2018.01)
  *H04W 76/25* (2018.01)
  *H04W 76/15* (2018.01)
  *H04W 88/06* (2009.01)

(56) References Cited

U.S. PATENT DOCUMENTS

| | | | |
|---|---|---|---|
| 2013/0189973 A1* | 7/2013 | Chang | H04W 24/04 |
| | | | 455/423 |
| 2014/0274030 A1 | 9/2014 | Aminzadeh et al. | |
| 2014/0335872 A1 | 11/2014 | Yamada | |
| 2014/0349694 A1 | 11/2014 | Raghothaman et al. | |
| 2015/0049707 A1* | 2/2015 | Vajapeyam | H04W 24/10 |
| | | | 370/329 |
| 2015/0223212 A1* | 8/2015 | Der Velde | H04L 5/0032 |
| | | | 370/329 |
| 2015/0223282 A1 | 8/2015 | Vajapeyam et al. | |
| 2016/0192249 A1* | 6/2016 | Wu | H04W 76/18 |
| | | | 370/331 |
| 2016/0242064 A1* | 8/2016 | Lee | H04W 24/10 |
| 2016/0316508 A1* | 10/2016 | Hong | H04W 28/08 |
| 2017/0111932 A1* | 4/2017 | Uemura | H04W 74/0833 |

OTHER PUBLICATIONS

Unknown, Author, "SCGfailure prohibit", Ericsson, 3GPP TSG. RAN WG2 #88, Tdoc R2-145008, San Francisco, USA, Nov. 17-21, 2014, 1-4.

Unknown, Author, "Remaining Details for SeNB Failure Repoiting", Nokia Networks, Nokia Corporation, 3GPP TSG-RAN WG2 Meeting #87bis, R2-144363, Shanghai, China, Oct. 6-10, 2018, 1-8.

Unknown, Author, "Report and summary of email discussion [87#22] [L TE/DC] S--RLF and Reestablishment", Huawei (Rapporteur), 3GPP TSG-RAN WG2 Meeting #87, R2-144540, Shanghai, China, Oct. 6-10, 2018, 1-29.

Unknown, Author, "Summary of email discussion [78#43] L TEiEDDA Power preference indication", ZTE, 3GPP TSG-RAN WG2 Meeting #79, R2-123413, Qingdao, P.R.C.,, Aug. 13-17, 2012, 1-21.

* cited by examiner

PROHIBITING FAILURE INDICATIONS FOR SECONDARY CELL GROUP FAILURE

TECHNICAL FIELD

The present invention generally relates to wireless communication networks, and particularly relates to failure detection and notification.

BACKGROUND

The 3rd Generation Partnership Project (3GPP) is specifying the Evolved Universal Terrestrial Radio Access Network (E-UTRAN) consisting of the Long Term Evolution (LTE) and System Architecture Evolution (SAE) concepts. The architecture of the LTE system is shown in FIG. 1.

LTE dual connectivity is a feature defined from the user equipment (UE) perspective, where the UE may simultaneously receive data from and transmit data to two different eNBs. This feature is part of 3GPP Rel-12. The two different eNBs are usually denoted as Master eNodeB (MeNB) and Secondary eNodeB (SeNB). Operating on different frequencies, the MeNB and SeNB provide separate cell groups for the UE, a master cell group (MCG) and a secondary cell group (SCG).

The protocol architecture for Release 12 (Rel-12) of the 3GPP specifications for LTE, as shown in FIG. 2, supports three types of radio bearers: MeNB bearers, split bearers, and SeNB bearers. In pre-Rel-12 LTE, i.e., before the introduction of dual connectivity, handover failures (HOF) and radio link failures (RLF) are detectable by the UE. The UE tries to reestablish its connection upon detection of such a failure. Otherwise, it goes to IDLE.

In detail, the following detection methods were considered. A handover failure timer, such as a T304 timer, is started upon reception of a radio resource control (RRC) connection reconfiguration message that includes mobility control information. The T304 timer is stopped upon successful random access to a target handover cell. Expiration of the T304 timer triggers a procedure for reestablishment of the RRC connection. A reestablishment timeout timer, such as a T311 timer, is started when the UE tries to reestablish RRC connection, and the T311 timer is stopped when successfully reestablished. At expiration of the T311 timer, the UE goes to IDLE or declares that reestablishment is unsuccessful. A detection of physical-layer (PHY) failure timer, such as a T310 timer, is started when a physical layer problem is indicated by physical layer, and the T310 timer is stopped when the physical-layer failure is indicated as being resolved by the physical layer. Upon expiration of the physical-layer failure timer, reestablishment of an RRC connection is triggered. The T310 timer can only be started if reestablishment is not already ongoing (i.e., only if T311 is not running), and only after successful handover (i.e., only if T304 is not running).

Other failure detection methods include a random access procedure (random access channel or RACH) failure that triggers reestablishment of an RRC connection if reestablishment is not already ongoing (T311 is not running), and only after successful handover (T304 is not running) A radio link control (RLC) failure triggers reestablishment of an RRC connection, if reestablishment not already ongoing (T311 is not running) RLC failure cannot happen when T304 is running, since a random access procedure is pending during that time period and RLC retransmissions have not yet been started.

For dual connectivity, a new event, known as secondary-cell-group failure (SCG failure) or SeNB radio-link failure (S-RLF), has been introduced. When this event is triggered, the UE stops uplink transmission in the SeNB, suspends SCG and split bearers, and sends an indication to the MeNB. The indication is sent via an RRC message in uplink and can be called a "UE failure indication," which can be regarded as an "SCG Failure Information message.

The following are considered to be SCG failure-triggering events. An SCG change failure timer (also known as a T307 timer), is started when SCG change is triggered, and stopped after successful random access to a new SCG. The SCG change failure timer is similar to the pre-Rel-12 T304 handover failure timer, but being related to the SCG, the procedure similar to handover is called SCG change. If the SCG change failure timer expires, the UE triggers failure indication, with an RRC message to the MeNB. An SCG physical layer (PHY) failure timer (also known as a T313 timer), is started when an SCG PHY problem is detected, but SCG change is currently not ongoing (the SCG change failure timer is not running). The SCG PHY failure timer is similar to the pre-Rel-12 radio link failure timer T310, but the SCG PHY failure timer is related to the SCG. This SCG PHY failure timer is stopped when an SCG physical layer problem is indicated as being resolved by SCG PHY. If the SCG PHY failure timer expires, the UE triggers failure indication in an RRC message to the MeNB. SCG MAC failure triggers the sending of a UE failure indication in an RRC message to the MeNB, if SCG change is not currently ongoing (i.e., if the SCG change failure timer is not running) SCG MAC failure occurs when the UE has repeated random access procedures and preamble transmissions more than a configurable threshold. SCG RLC failure triggers the sending of a UE failure indication RRC message to the MeNB, but SCG RLC failure cannot happen while the SCG change failure timer is running SCG RLC failure occurs when the number of RLC retransmissions exceeds a configurable threshold.

In each of the failure events, it is assumed that the failure type is indicated in the RRC message. It is currently unclear how many UE failure indication RRC messages are sent (and when) to the MeNB for the concurrent SCG failure detection methods defined above. Too many UE failure indications may waste radio resources and load the MeNB unnecessarily.

SUMMARY

Embodiments of the present inventive concepts describe the prohibiting of unnecessary UE failure indications from being sent upon SCG failure detection. This can be achieved by a prohibit timer or a prohibit state in the UE.

According to some embodiments, a method, in a UE operating in a network that supports dual connectivity operation, for minimizing transmission of unnecessary UE failure indications, includes detecting SCG failure for the UE, in response to detecting one of a plurality of SCG failure-triggering events. The method also includes sending a UE failure indication message, in response to the detecting SCG failure, and refraining from sending further UE failure indication messages in response to SCG failure-triggering events, until the sending of further UE failure indication messages is reenabled.

In some cases, the refraining may include setting a state of the UE to a UE prohibit state to prohibit sending further UE failure indication messages while in the UE prohibit state. In other cases, the refraining may include starting a prohibit timer to prohibit sending further UE failure indication messages during the prohibit timer.

According to some embodiments, a UE is adapted to detect SCG failure for the UE, in response to detecting one of a plurality of SCG failure-triggering events, send a UE failure indication message, in response to the detecting SCG failure, and refrain from sending further UE failure indication messages in response to SCG failure-triggering events, until the sending of further UE failure indication messages is reenabled.

In some cases, the UE is adapted to set a state of the UE to a UE prohibit state to prohibit sending further UE failure indication messages while in the UE prohibit state. In other cases, the UE is adapted to start a prohibit timer to prohibit sending further UE failure indication messages during the prohibit timer.

According to some embodiments, a method, in a network node, for minimizing transmission of unnecessary UE failure indications includes receiving a UE failure indication message indicating that the UE is prohibited from sending UE failure indications in response to SCG failure-triggering events, and sending an RRC connection reconfiguration message to indicate to the UE that the UE is reenabled to send UE failure indications in response to SCG failure-triggering events.

According to some embodiments, a network node is adapted to receive a UE failure indication message indicating that the UE is prohibited from sending UE failure indications in response to SCG failure-triggering events, and send an RRC connection reconfiguration message to indicate to the UE that the UE is reenabled to send UE failure indications in response to SCG failure-triggering events.

Further embodiments may include computer program products and non-transitory computer readable media that store instructions that, when executed by processing circuit, perform the operations of the embodiments describe above.

Of course, the present invention is not limited to the above features and advantages. Indeed, those skilled in the art will recognize additional features and advantages upon reading the following detailed description, and upon viewing the accompanying drawings.

DETAILED DESCRIPTION

In LTE dual-connectivity scenarios, a UE failure indication upon SCG failure may be transmitted multiple times. This is due to the fact that the evaluations of SCG PHY, SCG RACH and SCG RLC failure detection run in parallel, independently of each other. In LTE legacy behavior, concurrent SCG PHY, RACH, and RLC failure detection is handled by avoiding subsequent triggering of reestablishment if a T311 timer is running.

Embodiments described herein provide solutions to control multiple SCG failure-triggering events in LTE dual connectivity.

Prohibit State

Figure 1:
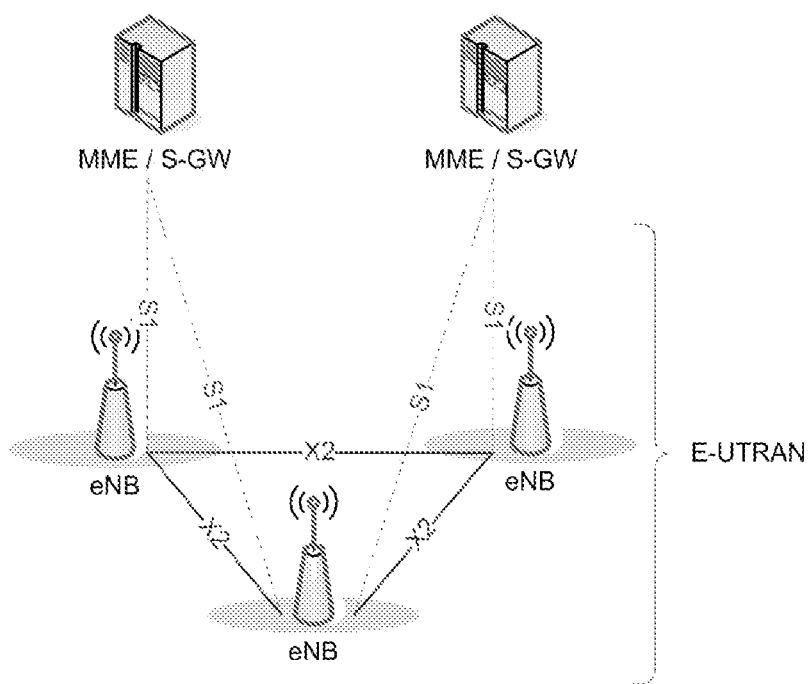
FIG. 1 illustrates an example architecture of LTE.
Figure 2:
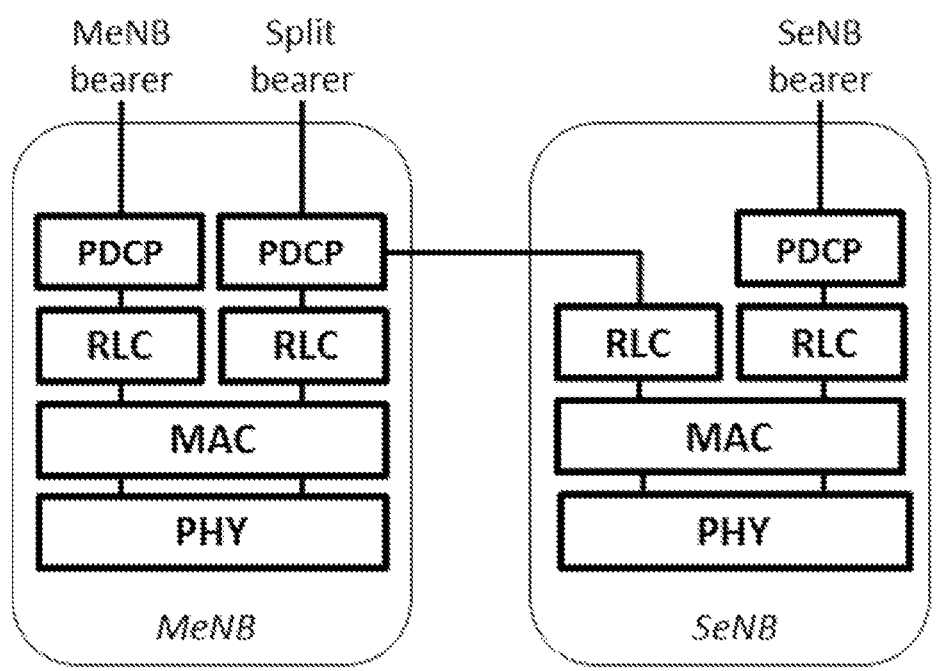
FIG. 2 illustrates an architecture for 3GPP Rel-12, including support for three bearers.
Figure 3:
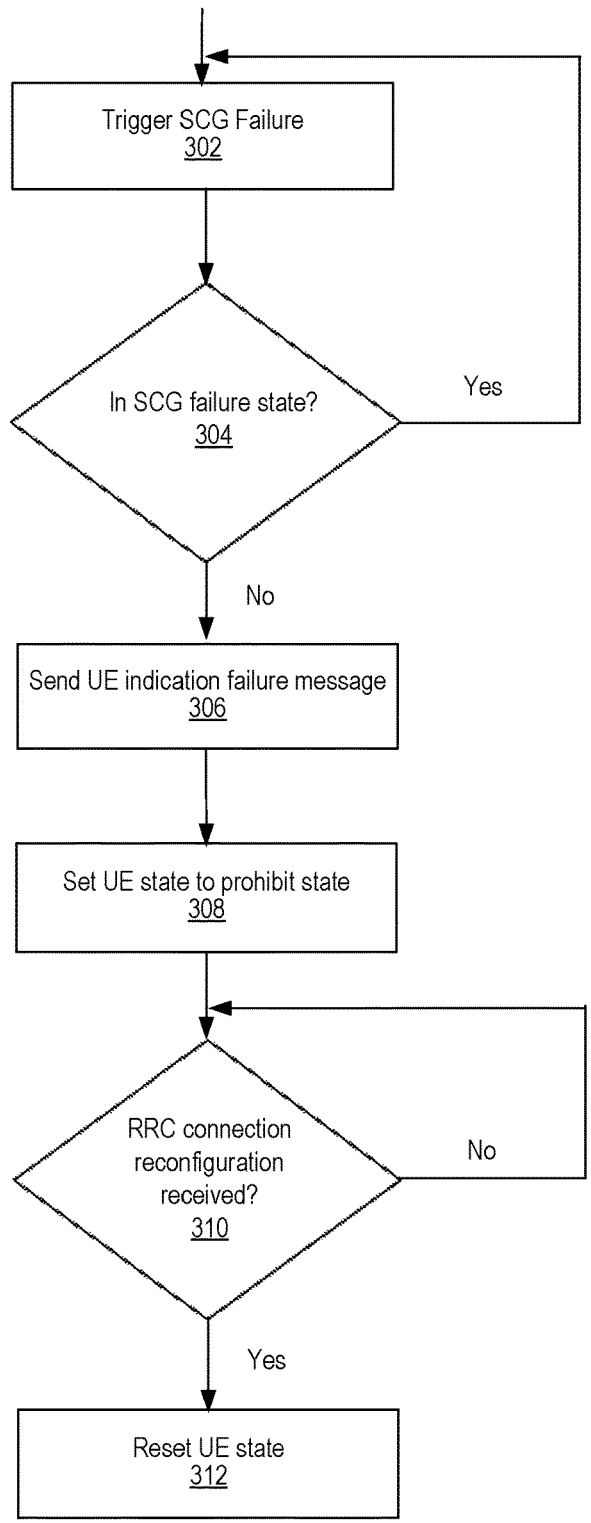
FIG. 3 is a flowchart illustrating a method in a UE for minimizing the transmission of unnecessary UE failure indications, according to some embodiments.

FIG. 3 illustrates use of a UE prohibit state to minimize unnecessary UE failure indications. Once the UE triggers SCG failure (Block 302) and sends the UE failure indication message to the MeNB (Block 306), the UE considers itself in SCG failure state (Block 304). SCG failure state may be triggered due to detection of an SCG change failure timer expiration, an SCG PHY failure timer expiration, an SCG RACH failure, or an SCG RLC failure, for example. A UE state is set to a UE prohibit state (Block 308). The prohibit state may be implemented by means of a UE variable.

During this UE prohibit state, the UE is not permitted to trigger SCG failure, or send any more UE failure indications or corresponding RRC messages in response to SCG failure-triggering events. For example, the UE is prohibited from starting an SCG PHY failure timer when it is in the UE prohibit state. In another example, the UE is prohibited from sending UE failure indications when the SCG PHY failure timer expires, if the UE is in the UE prohibit state. The UE is also prohibited from sending UE failure indications when SCG RACH failure or SCG RLC failure is detected, when the UE is already in the UE prohibit state.

Upon the first successful RRC connection reconfiguration after setting the UE prohibit state (Block 310), the UE state is reset (Block 312). This means that the UE prohibit state is toggled off so that the UE is again allowed to send UE failure indications or to trigger SCG-failure state. In some cases, the UE state is reset once the SCG change failure timer is started. The UE state is reset when the UE goes from IDLE to CONNECTED, or when the UE is reconfigured to activate dual connectivity.

In some cases, the UE state is reset when the UE receives an RRC Connection Reconfiguration message reconfiguring SCG parameters, for example, either releasing the SCG or modifying it. If the UE receives an RRC Connection Reconfiguration message that only configures MCG parameters, then the UE state is not impacted.

Prohibit Timer

Figure 4:
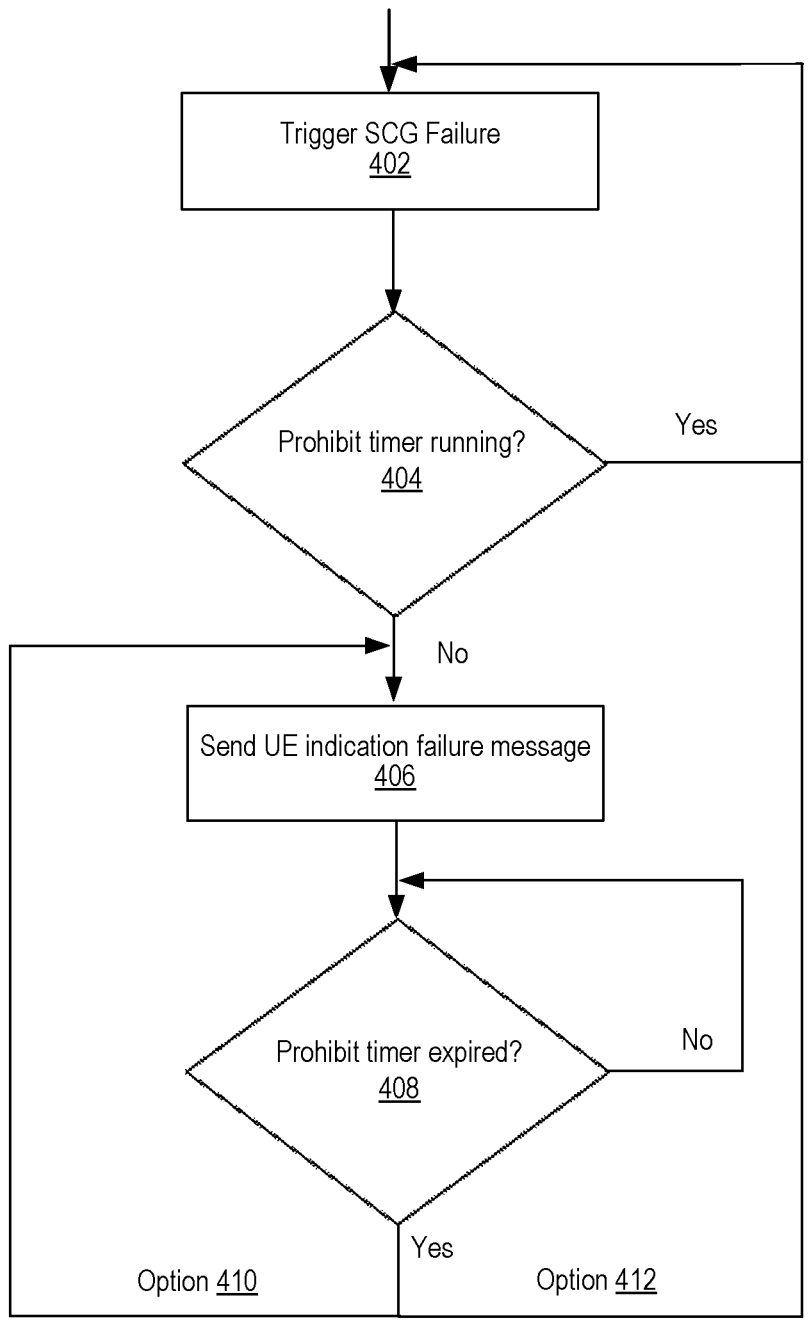
FIG. 4 is a flowchart illustrating another method in a UE for minimizing the transmission of unnecessary UE failure indications, according to some embodiments.

FIG. 4 illustrates use of a UE prohibit timer to minimize unnecessary UE failure indications. While in some scenarios it may be beneficial for the MeNB to be informed multiple times about potentially different SCG failures, it may be necessary to prohibit UE failure indications for some time. When necessary, a UE failure indication is sent (Block 406) and the prohibit timer is started when SCG failure is triggered (Block 402). SCG failure may be triggered upon detection of SCG change failure at the SCG change failure timer expiry, SCG failure due to the SCG PHY failure timer expiry, SCG RACH failure or SCG RLC failure. The prohibit timer length may be configured by the network, including with RRC messaging.

The prohibit timer will be started if the prohibit timer is not already running (Block 404). During the duration of the prohibit timer, SCG failure cannot be triggered and/or UE failure indications cannot be sent in response to SCG failure-triggering events. The prohibit timer can expire (Block 408), which will again allow the sending of UE failure indications (Option 410) or the triggering of SCG failure (Option 412).

The timer may also be stopped upon the first successful RRC connection reconfiguration after SCG failure was detected. In some cases, the SCG PHY failure timer is stopped once the SCG change failure timer is started. In some cases, the prohibit timer is stopped when the UE receives RRC Connection Reconfiguration message reconfiguring SCG parameters, such as for either releasing the SCG or modifying it. If the UE receives an RRC Connection Reconfiguration that only configures MCG parameters, then the prohibit timer is not impacted.

Expiration of the prohibit timer may also indicate that the UE did not receive an answer to the UE failure indication it tried to send. For example, the transmission failed, the MeNB did not send the answering RRC connection reconfiguration, or the transmission of the MeNB answer failed. In this case, the UE would be permitted to send another UE failure indication due to SCG failure. This may indicate that the prohibition of UE failure indications has ended.

In a further embodiment, repeated transmission of the original UE failure indication may be enforced upon expiration of the prohibit timer. In yet another embodiment, the latest reported failure type (SCG PHY, SCG MAC, SCG RACH, SCG RLC, or SCG change) should replace the failure cause of the failure type of the original UE failure indication, and the UE failure indication should be sent again. Also, current measurement results can be included in the new UE failure indication.

Figure 5:
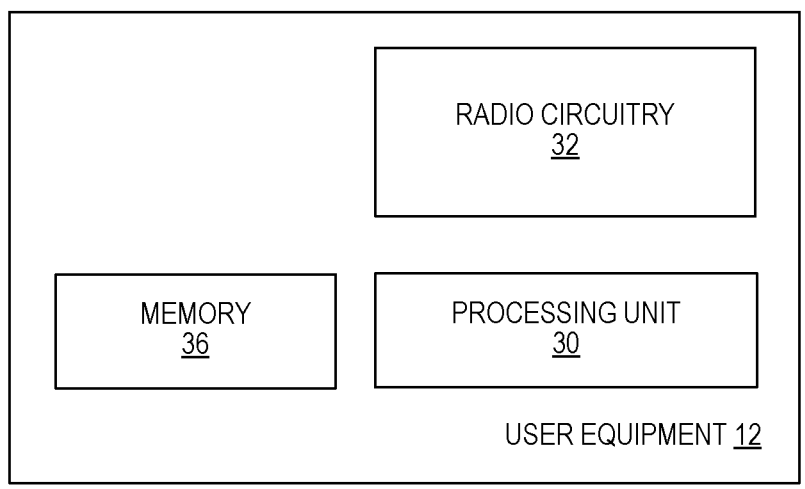
FIG. 5 is a block diagram of a UE configured to minimize the transmission of unnecessary UE failure indications, according to some embodiments.

Some embodiments of the present inventive concepts are implemented by a UE 12 exemplified in FIG. 5. The UE 12 represents any wireless device referred to as a mobile terminal, wireless terminal and/or a mobile station that may be portable, pocket-storable, hand-held, computer-comprised, or vehicle-mounted. For example, the UE 12 may be a mobile telephone, cellular telephone, laptop, tablet computer, or surf plate with wireless capability. The UE 12 is enabled to communicate wirelessly with other devices, telephones or servers via a Radio Access Network (RAN) and possibly one or more core networks, comprised within a cellular communications network or wireless communication system, sometimes also referred to as a cellular radio system or a cellular network. A cellular network covers a geographical area which is divided into cell areas, where each cell area is served by a radio network node. A cell is the geographical area where radio coverage is provided by the radio network node. The radio network node may be, for example, a base station such as a Radio Base Station (RBS), eNB, eNodeB, NodeB, B node, or Base Transceiver Station (BTS), depending on the technology and terminology used. The base stations may be of different classes such as a macro eNodeB, home eNodeB or pico base station, based on transmission power and cell size.

Further, each radio network node may support one or several communication technologies. The radio network nodes communicate over the air interface operating on radio frequencies with the wireless devices within range of the radio network node. In the context of various embodiments described herein, the expression downlink (DL) is used for the transmission path from the base station to the wireless device. The expression uplink (UL) is used for the transmission path in the opposite direction, such as from the wireless device to the base station.

As shown in FIG. 5, the UE 12 is arranged with radio circuitry 32 to communicate with radio network nodes, a memory 36 to store information related to the embodiments, and a processing unit 30. The radio circuitry 32 is configured to receive configuration messages, such as an RRC connection reconfiguration message, from a network node such as an eNB. The radio circuitry 32 is further configured to send a UE failure indication message. Memory 36 is configured to store information related to embodiments described herein and may include any mix of storage circuits. The memory 36 may provide non-transitory storage for a computer program and configuration data. The processing unit 30 comprises appropriately configured processing circuitry, such as one or more microprocessors, microcontrollers, digital signal processors, and/or other digital logic, and is configured to process data and information signaled to and from the radio circuitry 32.

According to some embodiments, the processing unit 30 is configured to detect SCG failure for the UE, in response to detecting one of a plurality of SCG failure-triggering events, and send a UE failure indication message, in response to the detecting SCG failure. The processing unit 30 is also configured to refrain from sending further UE failure indication messages in response to SCG failure-triggering events, until the sending of further UE failure indication messages is reenabled.

In some cases, the processing unit 30 is adapted to set a state of the UE to a UE prohibit state to prohibit sending further UE failure indication messages while in the UE prohibit state. In other cases, the processing unit 30 is adapted to start a prohibit timer to prohibit sending further UE failure indication messages during the prohibit timer. Optionally, the processing unit 30 is configured to reset the UE state when a RRC connection reconfiguration message is received from a base station.

Figure 6:
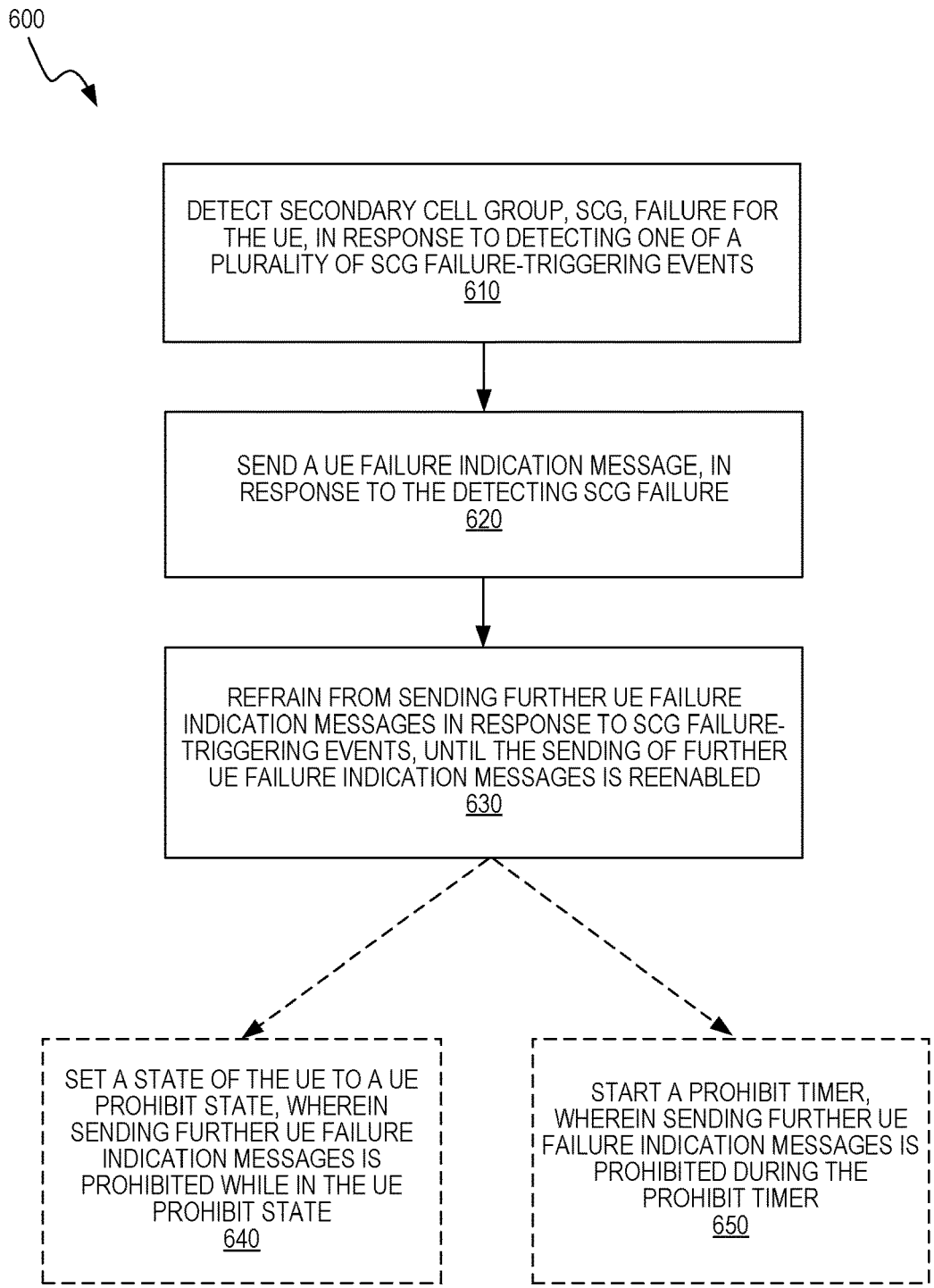
FIG. 6 is a flowchart illustrating a method in a UE for minimizing the transmission of unnecessary UE failure indications, according to some embodiments.

Regardless of its implementation details, the UE 12 in one or more embodiments is configured to perform a method 600, operating in a network that supports dual connectivity operation, for minimizing transmission of unnecessary UE failure indications, such as shown in FIG. 6. The method 600 includes detecting SCG failure for the UE, in response to detecting one of a plurality of SCG failure-triggering events (Block 610). These SCG failure-triggering events may include an expiration of an SCG change failure timer, an expiration of an SCG physical layer failure timer, an SCG RACH failure, an SCG MAC failure or an SCG RLC failure.

The method 600 also includes sending a UE failure indication message, in response to the detecting SCG failure (Block 620) and refraining from sending further UE failure indication messages in response to SCG failure-triggering events, until the sending of further UE failure indication messages is reenabled (Block 630).

In some cases, refraining from sending further UE failure messages comprises setting a state of the UE to a UE prohibit state, wherein sending further UE failure indication messages is prohibited while in the UE prohibit state (Block 640). An SCG PHY timer may also be prohibited from starting while in the UE prohibit state.

The UE state is reset in response to receiving an RRC connection reconfiguration message, according to further embodiments. This may include resetting the UE state in response to a RRC connection reconfiguration message reconfiguring SCG parameters to release or modify an SCG. The UE state can also be reset in response to a reconfiguration message to activate dual connectivity, a start of an SCG change failure timer, entering a connected state from an idle state, or determining that no answer to the UE failure indication was received.

In other cases, refraining from sending further UE failure messages comprises starting a prohibit timer, where sending further UE failure indication messages is prohibited during the prohibit timer (Block 650). An SCG physical layer failure timer may be prohibited from starting while in the UE prohibit state. The length of the prohibit timer may be set according to a predetermined length or a length that is received in a message, such as an RRC message.

The prohibit timer may expire or be stopped under certain circumstances. For example, the prohibit timer is stopped in response to receiving an RRC connection reconfiguration message or a dual connectivity reconfiguration message from another communication device. The prohibit timer may also be stopped in response to the RRC connection reconfiguration message reconfiguring SCG parameters to release or modify an SCG. In some cases, the prohibit timer is stopped in response to a first successful RRC configuration after SCG failure was detected. The prohibit timer may also be stopped in response to a start of an SCG change failure timer, determining that no answer to the UE failure indication was received, entering a connected state from an idle state, or a reconfiguration to activate dual connectivity.

In further embodiments, the method 600 may include sending another UE failure indication message upon expiration or stoppage of the prohibit timer. This may include resending the UE failure indication upon expiration or stoppage of the prohibit timer. Sending another UE failure indication message may also include sending a latest reported failure type instead of a failure type reported in the UE failure indication. Current measurement results may also be sent in the UE failure indication sent upon expiration or stoppage of the prohibit timer.

Figure 7:
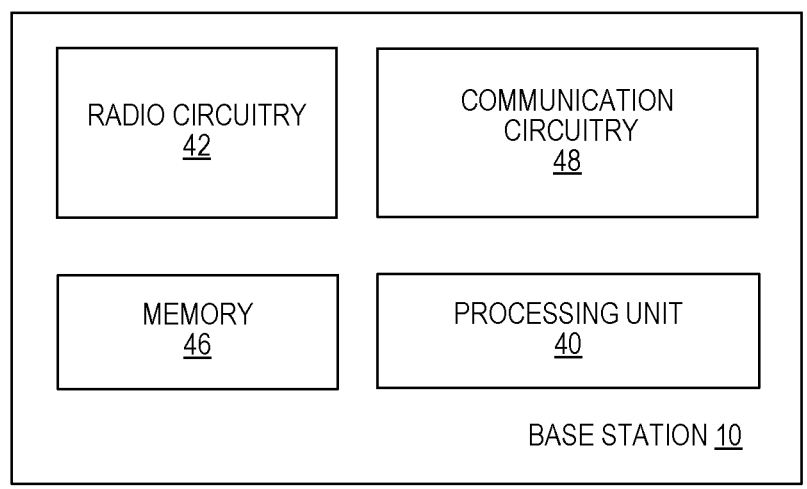
FIG. 7 is a block diagram of a base station configured to provide information assisting a UE in minimizing the transmission of unnecessary UE failure indications, according to some embodiments.
Figure 8:
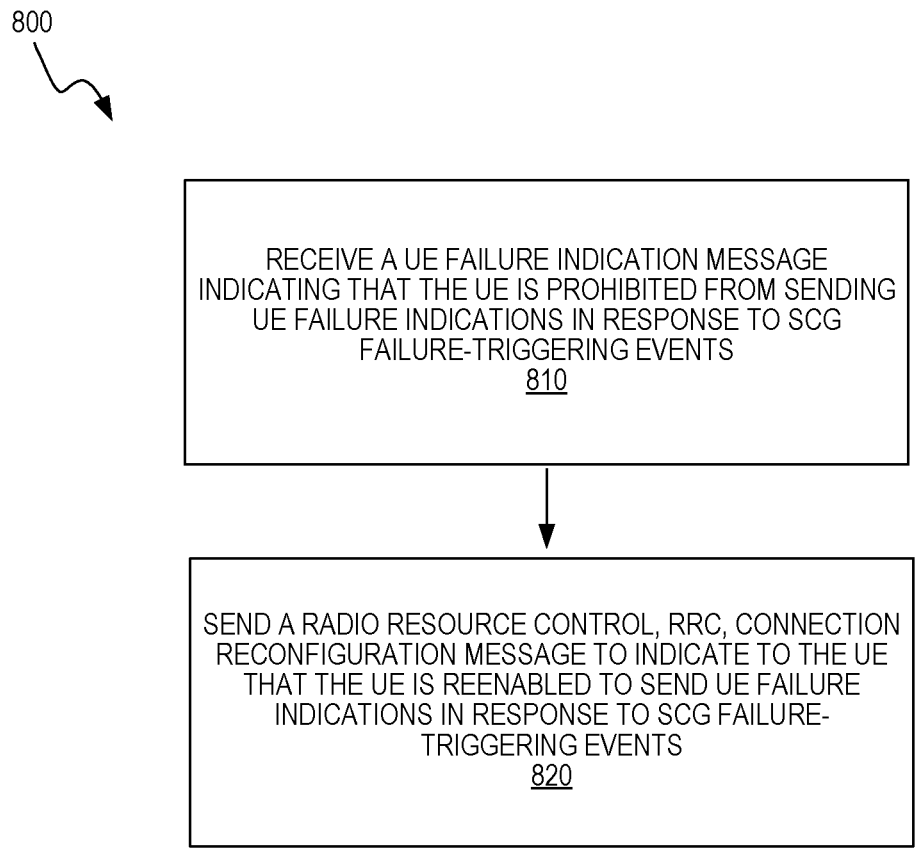
FIG. 8 is a flowchart illustrating a method in a base station for providing information assisting a UE in minimizing the transmission of unnecessary UE failure indications, according to some embodiments.

Some embodiments of the present invention are implemented by a radio network node, such as base station 10 exemplified in FIG. 7. The base station 10 is arranged with radio circuitry 42 to communicate with served wireless devices such as the UE 12, communication circuitry 48 to communicate with other radio network and core network nodes, memory 46 to store information related to the embodiments, and a processing unit 40. The communication circuitry 48 is configured to receive and send from/to a core network node, such as a mobility management entity (MME), information and signaling related to embodiments described herein. The radio circuitry 42 is configured to receive messages, such as a UE failure indication message, from the UE 12 and send configuration messages.

The memory 46 is configured to store information related to embodiments described herein and includes any mix of storage circuits. The memory 46 may provide non-transitory storage for a computer program and configuration data. The processing unit 40 comprises appropriately configured processing circuitry, such as one or more microprocessors, microcontrollers, digital signal processors, and/or other digital logic, and is configured to process data and information signaled to and from the communication and radio circuitry 42, 48. The processing unit 40 is configured to receive a UE failure indication message indicating that the UE 12 is prohibited from sending UE failure indications in response to SCG failure-triggering events, and send a RRC connection reconfiguration message to indicate to the UE 12 that the UE 12 is reenabled to send UE failure indications in response to SCG failure-triggering events.

Regardless of its implementation details, the base station 10 in one or more embodiments is configured to perform a method 800, including receiving a UE failure indication message indicating that the UE 12 is prohibited from sending UE failure indications in response to SCG failure-triggering events (Block 810), and sending a message, such as an RRC connection reconfiguration message, to indicate to the UE 12 that the UE 12 is reenabled to send UE failure indications in response to SCG failure-triggering events (Block 820).

In some cases, the method 800 may include sending a length of a prohibit timer in an RRC message to the UE 12, wherein the prohibit timer of the UE 12 prohibits sending of UE failure indications during the prohibit timer.

It should be understood that the methods illustrated in FIGS. 3-4, 6 and 8 are examples of the techniques described more fully above. Each of these methods may be modified according to any of the variations and details discussed. The methods illustrated in FIGS. 3-4, 6 and 8, and variants thereof, may be implemented using the processing units illustrated in FIGS. 5 and 7, as appropriate, where the processing units are processing circuits configured with appropriate program code stored in memory circuits, to carry out the operations described above. Embodiments of the presently disclosed techniques further include computer program products for application in a wireless terminal as well as corresponding computer program products for application in a base station apparatus or other network node apparatus. The program code or computer program instructions may also be stored in a non-transitory and tangible computer-readable medium.

Figure 9:
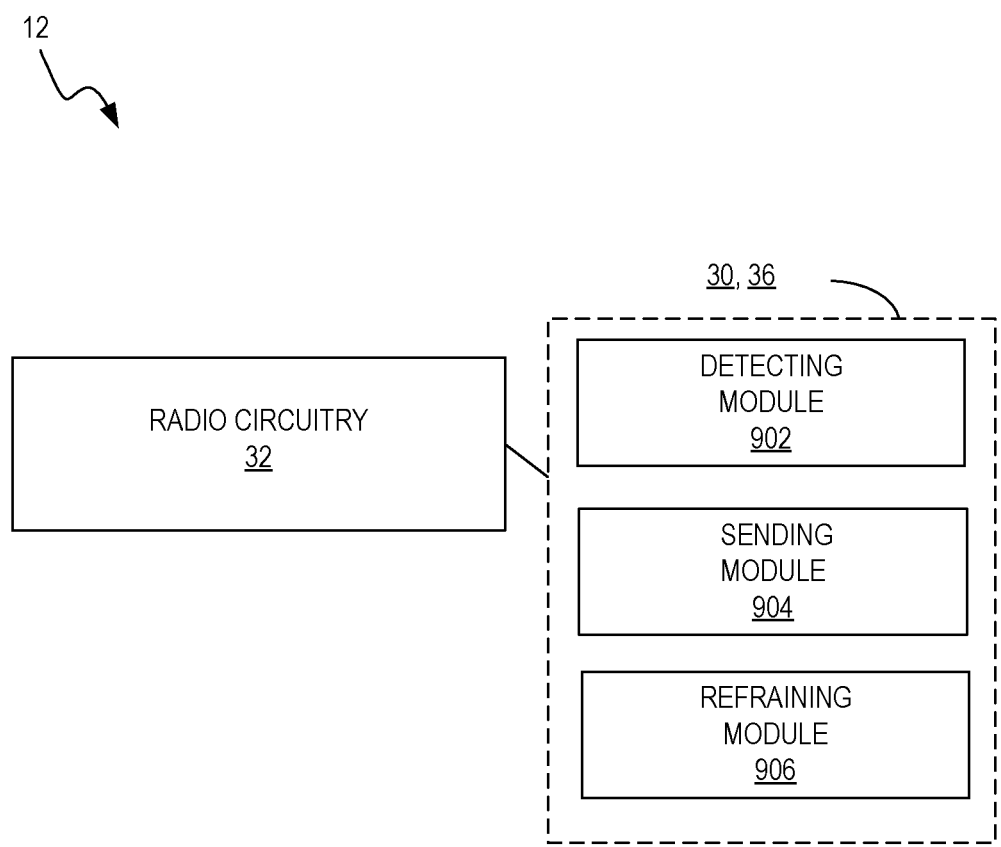
FIG. 9 is a block diagram of a functional implementation of a UE for minimizing the transmission of unnecessary UE failure indications, according to some embodiments.

It will be further appreciated that various aspects of the above-described embodiments can be understood as being carried out by functional "modules," which may be program instructions executing on an appropriate processor circuits, hard-coded digital circuitry and/or analog circuitry, or appropriate combinations thereof. For example, FIG. 9 illustrates an example functional module or circuit architecture as may be implemented in a UE 12, e.g., based on the processing unit 30 and the memory 36, to operate the UE 12 in a network that supports dual connectivity operation for minimizing transmission of unnecessary UE failure indications. The illustrated embodiment at least functionally includes a detecting module 902 for detecting SCG failure for the UE 12, in response to detecting one of a plurality of SCG failure-triggering events. The implementation also includes a sending module 904 for sending a UE failure indication message, in response to the detecting SCG failure, and a refraining module 906 for refraining from sending further UE failure indication messages in response to SCG failure-triggering events, until the sending of further UE failure indication messages is reenabled.

Figure 10:
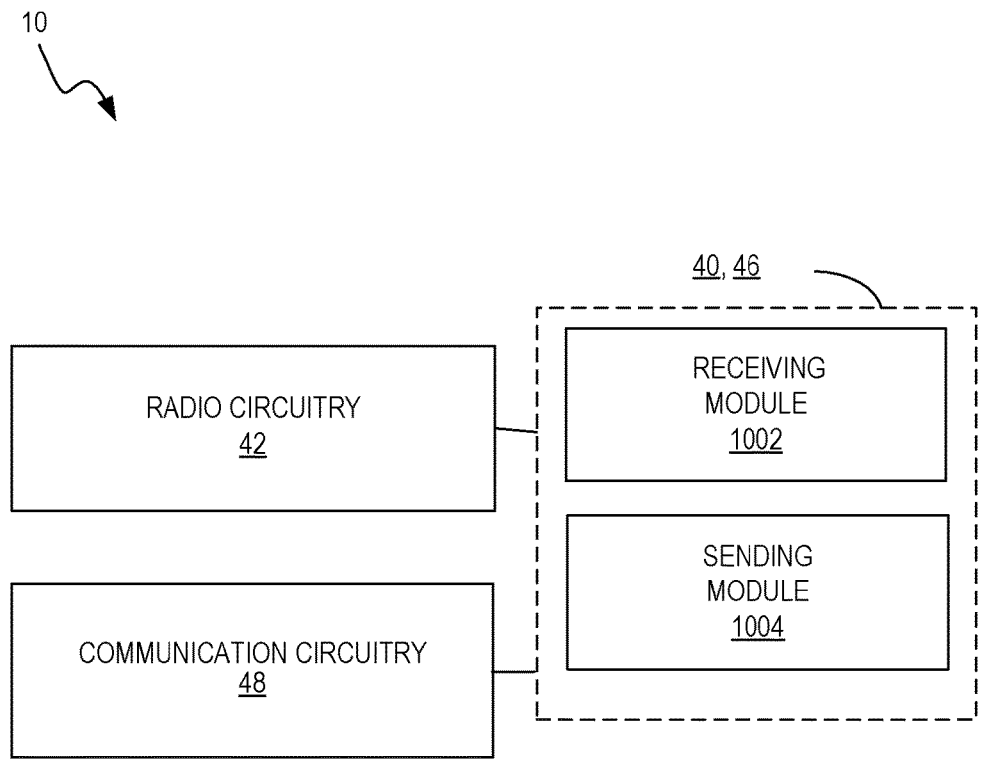
FIG. 10 is a block diagram of a functional implementation of a base station for providing information assisting a UE in minimizing the transmission of unnecessary UE failure indications, according to some embodiments.

In another example, FIG. 10 illustrates an example functional module or circuit architecture as may be implemented in a base station 10, e.g., based on the processing unit 40 and the memory 46, to operate the base station 10 in a network that supports dual connectivity operation. The illustrated embodiment at least functionally includes a receiving module 1002 for receiving a UE failure indication message indicating that the UE 12 is prohibited from sending UE failure indications in response to SCG failure-triggering events, and a sending module 1004 for sending an RRC connection reconfiguration message to indicate to the UE 12 that the UE 12 is reenabled to send UE failure indications in response to SCG failure-triggering events.

Thus, it is an object of embodiments herein to minimize unnecessary UE failure indications upon SCG failure detection in a wireless communication network. Advantages of the prohibit state and/or the prohibit timer of the embodiments include avoiding unexpected UE behavior and/or unnecessary transmissions. By avoiding such waste of radio resources, the system capacity will be increased.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a user equipment (UE) operating in a network that supports dual connectivity operation, for minimizing transmission of unnecessary UE failure indications, the method comprising:
   sending a UE failure indication message to the network, in response to a secondary cell group (SCG) failure detected by the UE;
   subsequently detecting one of a plurality of SCG failure-triggering events;
   responsive to said subsequently detecting, determining whether sending of further UE failure indication messages has been re-enabled; and
   sending an additional UE failure indication message for the detected SCG failure-triggering event, responsive to said determining.

2. The method of claim 1, wherein the detected SCG failure-triggering event is one of:
   an expiration of an SCG change failure timer;
   an SCG random access channel (RACH) failure;
   an SCG medium access control (MAC) failure; and
   an SCG radio link control (RLC) failure.

3. The method of claim 1, wherein determining whether sending of further UE failure indication messages has been re-enabled comprises checking a UE state to determine whether the UE remains in a UE prohibit state.

4. The method of claim 3, further comprising resetting the UE state in response to receiving a radio resource control (RRC) connection reconfiguration message.

5. The method of claim 4, further comprising resetting the UE state in response to the RRC connection reconfiguration message reconfiguring SCG parameters to release or modify an SCG.

6. The method of claim 3, further comprising resetting the UE state in response to a reconfiguration message to activate dual connectivity.

7. The method of claim 3, further comprising resetting the UE state in response to a start of an SCG change failure timer.

8. The method of claim 3, further comprising resetting the UE state in response to entering a connected state from an idle state.

9. The method of claim 3, further comprising resetting the UE state in response to determining that no answer to the UE failure indication was received.

10. The method of claim 1, wherein determining whether sending of further UE failure indication messages has been re-enabled comprises determining whether a prohibit timer is running.

11. The method of claim 10, further comprising stopping the prohibit timer in response to receiving a radio resource control (RRC) connection reconfiguration message from the other communication device.

12. The method of claim 11, further comprising stopping the prohibit timer in response to the RRC connection reconfiguration message reconfiguring SCG parameters to release or modify an SCG.

13. The method of claim 11, further comprising stopping the prohibit timer in response to a first successful radio resource control (RRC) configuration after SCG failure was detected.

14. The method of claim 11, further comprising stopping the prohibit timer in response to a start of an SCG change failure timer.

15. The method of claim 11, further comprising stopping the prohibit timer in response to determining that no answer to the UE failure indication was received.

16. The method of claim 11, further comprising stopping the prohibit timer in response to entering a connected state from an idle state.

17. The method of claim 11, further comprising stopping the prohibit timer in response to a reconfiguration to activate dual connectivity.

18. A user equipment (UE) comprising radio circuitry configured to communicate messages within a wireless network and further comprising a processing unit configured to control the radio circuitry and to:
   send a UE failure indication message to the network, in response to a secondary cell group (SCG) failure detected by the UE;
   subsequently detect one of a plurality of SCG failure-triggering events;
   responsive to said subsequently detecting, determine whether sending of further UE failure indication messages has been re-enabled; and
   send an additional UE failure indication message for the detected SCG failure-triggering event, responsive to said determining.

19. A non-transitory computer-readable medium comprising, stored thereupon, program instructions for a processing unit in a user equipment (UE), wherein the program instructions are configured so as to cause the UE, when the program instructions are executed by the processing unit, to:
   send a UE failure indication message to the network, in response to a secondary cell group (SCG) failure detected by the UE;
   subsequently detect one of a plurality of SCG failure-triggering events;
   responsive to said subsequently detecting, determine whether sending of further UE failure indication messages has been re-enabled; and
   send an additional UE failure indication message for the detected SCG failure-triggering event, responsive to said determining.

* * * * *

UNITED STATES PATENT AND TRADEMARK OFFICE
CERTIFICATE OF CORRECTION

PATENT NO. : 10,271,373 B2
APPLICATION NO. : 15/901577
DATED : April 23, 2019
INVENTOR(S) : Susitaival et al.

It is certified that error appears in the above-identified patent and that said Letters Patent is hereby corrected as shown below:

In the Specification

In Column 1, Line 61, delete "running) A" and insert -- running). A --, therefor.

In Column 1, Line 64, delete "running) RLC" and insert -- running). RLC --, therefor.

In Column 2, Line 8, delete "message." and insert -- message". --, therefor.

In Column 2, Line 30, delete "running)" and insert -- running). --, therefor.

In Column 2, Line 36, delete "running SCG" and insert -- running. SCG --, therefor.

Signed and Sealed this
Thirty-first Day of March, 2020

Andrei Iancu
*Director of the United States Patent and Trademark Office*